(12) United States Patent
Yagi et al.

(10) Patent No.: US 6,340,437 B1
(45) Date of Patent: Jan. 22, 2002

(54) PROCESS FOR PREPARING SYNTHESIS GAS BY AUTOTHERMAL REFORMING

(75) Inventors: Fuyuki Yagi; Atsuro Nagumo, both of Kawasaki; Yukitaka Wada, Yokohama; Mitsunori Shimura, Yokohama; Sachio Asaoka, Yokohama; Shuhei Wakamatsu, Sagamihara, all of (JP)

(73) Assignee: Chiyoda Corporation (JP)

( * ) Notice: Subject to any disclaimer, the term of this patent is extended or adjusted under 35 U.S.C. 154(b) by 0 days.

(21) Appl. No.: 09/254,636

(22) PCT Filed: Apr. 13, 1998

(86) PCT No.: PCT/JP98/01688

§ 371 Date: Mar. 11, 1999

§ 102(e) Date: Mar. 11, 1999

(87) PCT Pub. No.: WO98/46525

PCT Pub. Date: Oct. 22, 1998

(30) Foreign Application Priority Data

Apr. 11, 1997 (JP) ............................. 9-110436
Apr. 30, 1997 (JP) ............................. 9-126304
Jul. 31, 1997 (JP) ............................. 9-220092
Aug. 29, 1997 (JP) ............................. 9-250062

(51) Int. Cl.⁷ ........................... C07C 1/02; C01B 31/18; C01B 3/24; C01B 3/26; B01J 23/40
(52) U.S. Cl. .................... 252/373; 423/418.2; 423/650; 423/652; 502/326
(58) Field of Search .......................... 252/373; 423/650, 423/652, 418.2; 502/326

(56) References Cited

U.S. PATENT DOCUMENTS

| 3,222,132 A | 12/1965 | Dowden ................... 423/652 |
| 4,367,166 A | 1/1983 | Fujitani et al. ............. 423/652 |
| 4,415,484 A | 11/1983 | Setzer et al. ................ 423/651 |
| 5,246,791 A | 9/1993 | Fisher et al. ................ 429/16 |
| 5,348,717 A | 9/1994 | Clavenna et al. ........ 423/418.2 |
| 5,604,396 A | 2/1997 | Watanabe et al. ........... 313/485 |
| 5,614,163 A * | 3/1997 | Bhattacharyya et al. . 423/418.2 |
| 5,958,297 A * | 9/1999 | Primadl ....................... 252/373 |
| 5,989,457 A | 11/1999 | Seshan et al. ............... 252/373 |

FOREIGN PATENT DOCUMENTS

| JP | 5849602 | 3/1983 |
| JP | 60202740 | 10/1985 |
| JP | 2227141 | 9/1990 |
| JP | 2307802 | 12/1990 |
| JP | 4331704 | 11/1992 |
| JP | 9131533 | 5/1997 |
| WO | 9424042 | 10/1994 |

OTHER PUBLICATIONS

Rostrup—Nielsen et al, "$CO_2$—Reforming of Methane over Transition Metals", Journal of Catalysis 144, 38–49 (1993).

* cited by examiner

*Primary Examiner*—Steven P. Griffin
*Assistant Examiner*—Jonas N. Stickland
(74) *Attorney, Agent, or Firm*—Lorusso & Loud

(57) ABSTRACT

Disclosed is a process for producing a synthesis gas by an autothermal reforming method including a step of partially oxidizing a carbon-containing organic compound to produce a high temperature mixed gas, and a synthesis producing step of reacting the unreacted carbon-containing organic compound contained in the high temperature mixed gas with carbon dioxide and/or steam, wherein a catalyst having a considerably suppressed carbon deposition activity is used as a catalyst for the synthesis gas producing step. The catalyst is characterized in that the catalyst comprises a carrier formed of a metal oxide, and at least one catalytic metal selected from rhodium, ruthenium, iridium, palladium and platinum and supported on the carrier, in that the catalyst has a specific surface area of 25 $m^2/g$ or less, in that metal ion of the carrier metal oxide has electronegativity of 13.0 or less, and in that the amount of the catalytic metal supported is 0.0005–0.1 mole %, in terms of a metal, based on the carrier metal oxide.

5 Claims, No Drawings

PROCESS FOR PREPARING SYNTHESIS GAS BY AUTOTHERMAL REFORMING

TECHNICAL FIELD

The present invention relates to a process for producing a synthesis gas by an autothermal reforming method.

BACKGROUND ART

A synthesis gas is a mixed gas containing hydrogen and carbon monoxide and is widely used as a raw material for the synthesis of ammonia, methanol, acetic acid, etc.

Such a synthesis gas may be produced by reaction of a carbon-containing organic compound with steam and/or carbon dioxide in the presence of a catalyst. Since the reaction resulting in the formation of such a synthesis gas is very highly exothermic, a large amount of energy is required in order to maintain a reaction temperature (600–1,000° C.). Such a large amount of energy can be obtained by partially oxidizing a carbon-containing organic compound.

A process for the production of a synthesis gas including partial oxidation of a carbon-containing organic compound is carried out by partially oxidizing the carbon-containing organic compound to obtain a high temperature mixed gas having a temperature of at least 600° C. and containing an unreacted carbon-containing organic compound. The unreacted carbon-containing organic compound contained in the mixed gas is reacted with carbon dioxide and/or steam in the presence of a catalyst. In this method, however, carbon deposition reactions occur as side reactions to cause carbon deposition, when the unreacted carbon-containing organic compound contained in the mixed gas is reacted with carbon dioxide and/or steam to form the synthesis gas. The deposited carbon causes a problem, because the catalyst is poisoned.

The raw materials for the carbon deposition are a carbon-containing organic compound used as a raw material and CO produced in situ. The carbon deposition is accelerated as the partial pressures of these raw materials increase. Therefore, it is possible to reduce the amount of the carbon deposition by increasing the feed amount of steam and carbon dioxide while reducing the reaction pressure. In this case, however, it is necessary to excessively use steam and carbon dioxide in order to reduce the partial pressures of the carbon-containing organic compound and CO, so that several disadvantages are caused. For example, consumption of heat energy required for preheating steam and carbon dioxide increases. Further, costs for the separation of these gases from the product increase. Moreover, since a large reaction apparatus is required, the apparatus costs increase.

JP-A-5-208801 discloses a carbon dioxide-reforming catalyst containing a Group VIII metal supported on high purity, super-fine single crystal magnesium oxide. JP-A-6-279003 discloses a carbon dioxide-reforming catalyst containing a ruthenium compound supported on a carrier composed of a compound of at least one alkaline earth metal oxide and aluminum oxide. JP-A-9-168740 discloses a carbon dioxide-reforming catalyst containing rhodium supported on a carrier formed of a Group II–IV metal oxide or a lanthanoid metal oxide or a composite carrier composed of the above metal oxide and alumina. The reaction experiments using these catalysts are performed under ambient pressure. At a high pressure, which is industrially significant, these catalysts show a high carbon deposition activity and, hence, are not satisfactory as industrially applicable catalysts.

The objects of the present invention are:
(1) to provide a process for the production of a synthesis gas which includes a step of partially oxidizing a carbon-containing organic compound and a step of reacting an unreacted carbon-containing organic compound contained in the thus obtained high temperature mixed gas with carbon dioxide and/or steam in a pressurized condition and which can solve a problem of carbon deposition.
(2) to provide a process in which a catalyst having suppressed carbon deposition activity is used for the reaction of the unreacted carbon-containing organic compound contained in the high temperature mixed gas with carbon dioxide and/or steam.

Other objects of the present invention will be understood from the following description of the specification.

DISCLOSURE OF THE INVENTION

The present inventors have made an intensive study to accomplish the above-described objects and, as a result, have completed the present invention.

In accordance with the present invention there is provided a process for producing a synthesis gas from a carbon-containing organic compound, characterized
(i) in that said carbon-containing organic compound is partially oxidized to form a mixed gas having a temperature of at least 600° C. and containing an unreacted carbon-containing organic compound,
(ii) in that said unreacted carbon-containing organic compound contained in said high temperature mixed gas is reacted with carbon dioxide and/or steam under pressurized conditions in the presence of a catalyst, and
(iii) in that said catalyst comprises a carrier formed of a metal oxide, and at least one catalytic metal selected from rhodium, ruthenium, iridium, palladium and platinum and supported on said carrier, said catalyst having a specific surface area of 25 $m^2/g$ or less, metal ion of said carrier metal oxide having electronegativity of 13.0 or less, the amount of said catalytic metal supported being 0.0005–0.1 mole %, in terms of a metal, based on said carrier metal oxide.

The present invention also provides a process for producing a synthesis gas from a carbon-containing organic compound, characterized
(i) in that a catalyst is fluidized by a blended gas containing said carbon-containing compound, air and/or oxygen, and carbon dioxide and/or steam,
(ii) said carbon-containing organic compound contained in said blended gas by which said catalyst is fluidized is partially oxidized to form a mixed gas having a temperature of at least 600° C. and containing an unreacted carbon-containing organic compound, said unreacted carbon-containing organic compound being reacted with carbon dioxide and/or steam under pressurized conditions, and
(iii) in that said catalyst comprises a carrier formed of a metal oxide, and at least one catalytic metal selected from rhodium, ruthenium, iridium, palladium and platinum and supported on said carrier, said catalyst having a specific surface area of 25 $m^2/g$ or less, metal ion of said carrier metal oxide having electronegativity of 13.0 or less, the amount of said catalytic metal supported being 0.0005–0.1 mole %, in terms of a metal, based on said carrier metal oxide.

The catalyst used in the present (hereinafter referred to also as catalyst of the present invention) invention contains at least one catalytic metal selected from rhodium (Rh), ruthenium (Ru), iridium (Ir), palladium (Pd) and platinum (Pt) supported on a carrier metal oxide having specific characteristics. In this case, the catalytic metal can be supported in the form of a metallic state or in the form of a metal compound such as an oxide.

The catalyst of the present invention is characterized in that the catalyst has activity required for converting a carbon-containing organic compound into a synthesis gas while exhibiting a function to significantly suppress side reactions of carbon deposition reactions.

The catalyst used in the present invention can significantly suppress the carbon deposition reactions is characterized in that:

(i) the electronegativity of the metal ion of the carrier metal oxide is 13.0 or less;
(ii) the catalyst has a specific surface area of 25 m$^2$/g or less; and
(iii) the amount of the supported catalytic metal is 0.0005–0.1 mole % based on the carrier metal oxide. Such a catalyst having a considerably suppressed carbon deposition activity has been first found by the present inventors.

The metal oxide used as a carrier may be a single metal oxide or a mixed metal oxide. In the present invention, the electronegativity of the metal ion in the carrier metal oxide is 13 or less, preferably 12 or less, more preferably 10 or less. The lower limit is about 4. Thus, the electronegativity of the metal ion in the carrier metal oxide used in the present invention is 4–13, preferably 4–12. The electronegativity of the metal ion in the metal oxide in excess of 13 is not preferable, because carbon deposition occurs significantly.

The electronegativity of the metal ion in the metal oxide is defined by the following formula:

$$Xi=(1+2i)Xo$$

wherein

Xi: electronegativity of the metal ion
Xo: electronegativity of the metal
i: valence electron number.

When the metal oxide is a mixed metal oxide, an average electronegativity of the metal ions is used. The average value is a sum of the products of the electronegativity of each of the metal ions contained in the mixed metal oxide by the molar fraction of the corresponding metal oxide of the mixed metal oxide.

The electronegativity (Xo) of a metal is in accordance with Pauling. The electronegativity in accordance with Pauling is as shown in "W. J. Moore Physical Chemistry, Vol. 1 translated by FUJISHIRO, Ryoichi", 4th Edition, Tokyo Kagaku Dojin, p. 707 (1974), Table 15.4.

The electronegativity of metal ion in a metal oxide is described in detail in, for example, "Shokubaikoza, vol. 2, p145 (1985) edited by Catalyst Society of Japan".

The metal oxides may include those containing one or at least two metals such as Mg, Ca, Ba, Zn, Al, Zr and La. Illustrative of such metal oxides are single metal oxides such as magnesia (MgO), calcium oxide (CaO), barium oxide (BaO), zinc oxide (ZnO), alumina ($Al_2O_3$), zirconia ($ZrO_2$) and lanthanum oxide ($La_2O_3$), and mixed metal oxides such as MgO/CaO, MgO/BaO, MgO/ZnO, MgO/$Al_2O_3$, MgO/$ZrO_2$, CaO/BaO, CaO/ZnO, CaO/$Al_2O_3$, CaO/$ZrO_2$, BaO/ZnO, BaO/$Al_2O_3$, BaO/$ZrO_2$, ZnO/$Al_2O_3$, ZnO/$ZrO_2$, $Al_2O_3$/$ZrO_2$, $La_2O_3$/MgO, $La_2O_3$/$Al_2O_3$ and $La_2O_3$/CaO.

The catalyst used in the present invention having a specific surface area of 25 m$^2$/g or less may be obtained by calcining a carrier metal oxide before the support of a catalytic metal at 300–1,300° C., preferably 650–1,200° C. After the catalytic metal has been supported, the catalytic metal-supported carrier is further calcined at 600–1,300° C., preferably 650–1,200° C. It is also possible to obtain the catalyst by supporting a catalytic metal on a carrier metal oxide, followed by the calcination of the catalytic metal supporting product at 600–1,300° C., preferably 650–1,200° C. The upper limit of the calcination temperature is not specifically limited but is generally 1,500° C. or less, preferably 1,300° C. or less. In this case, the specific surface area of the catalyst or the carrier metal oxide can be controlled by the calcination temperature and calcination time.

The specific surface area of the catalyst or the carrier metal oxide used in the present invention is preferably 20 m$^2$/g or less, more preferably 15 m$^2$/g or less, most preferably 10 m$^2$/g or less. The lower limit of the specific surface area is about 0.01 m$^2$/g. By specifying the specific surface area of the catalyst or the carrier metal oxide in which the electronegativity of the metal ion is 13 or less in the above range, the carbon deposition activity of the catalyst can be significantly suppressed.

The amount of the catalytic metal supported on the carrier metal oxide is at least 0.0005 mole %, preferably at least 0.001 mole %, more preferably at least 0.002 mole %, in terms of metal, based on the carrier metal oxide. The upper limit is generally 0.1 mole %, preferably 0.09 mole %. In the present invention, the amount of metal supported is desirably in the range of 0.0005–0.1 mole %, preferably 0.001–0.1 mole %.

In the catalyst of the present invention, the specific surface area of the catalyst is substantially the same as that of the carrier metal oxide. Thus, in the present specification, the term "specific surface area of a catalyst" is used as having the same meaning as "specific surface area of a carrier metal oxide thereof".

The term "specific surface area" referred to in the present specification in connection with a catalyst or a carrier metal oxide is as measured by the "BET method" at a temperature of 15° C. using a measuring device "SA-100" manufactured by Shibata Science Inc.

The catalyst used in the present invention has a small specific surface area and has an extremely small amount of a supported catalytic metal so that the carbon deposition activity thereof is considerably suppressed. Yet, the catalyst has satisfactory activity for converting a raw material carbon-containing organic compound into a synthesis gas.

The catalyst used in the present invention may be prepared by conventional methods. One preferred method of preparing the catalyst of the present invention is an impregnation method. To prepare the catalyst of the present invention by the impregnation method, a catalyst metal salt or an aqueous solution thereof is added to and mixed with an aqueous dispersion containing a carrier metal oxide. The carrier metal oxide is then separated from the aqueous solution, followed by drying and calcination. A method (incipient-wetness method) is also effective in which a carrier metal oxide is added with a solution of a metal salt little by little in an amount corresponding to a pore volume to uniformly wet the surface of the carrier, followed by drying and calcination. In these methods, a water soluble salt is used as the catalyst metal salt. Such a water soluble salt may be a salt of an inorganic acid, such as a nitrate or a hydrochloride, or a salt of an organic acid, such as an acetate or an oxalate. Alternately, a metal acetylacetonate, etc. may be dissolved in an organic solvent such as acetone and the solution may be impregnated into the carrier metal oxide. The drying is performed at a temperature of 100–200° C., preferably 100–150° C. when the metal oxide is impregnated with an aqueous solution of a catalytic metal salt. When the impregnation is performed using an organic solvent, the drying is performed at a temperature higher by 50–100° C. than the boiling point of the solvent. The calcination temperature and time are adequately selected according to the specific surface area of the carrier metal oxide or catalyst obtained (the specific surface area of the catalyst). Generally, a calcination temperature in the range of 500–1,100° C. is used.

In the preparation of the catalyst of the present invention, the metal oxide used as a carrier may be a product obtained by calcining a commercially available metal oxide or a commercially available metal hydroxide.

The purity of the metal oxide is at least 98% by weight, preferably at least 99% by weight. It is, however, undesirable that components which enhance carbon deposition activity or components which are decomposed under reducing conditions, such as metals, e.g. iron and nickel, and silicon dioxide ($SiO_2$). Such impurities in the metal oxide are desired to be not greater than 1% by weight, preferably not greater than 0.1% by weight.

The catalyst of the present invention may be used in various forms such as powdery, granular, spherical, columnar and cylindrical forms. The form may be appropriately selected according to the catalytic bed system used.

In the present invention, a synthesis gas may be produced by reacting a carbon-containing organic compound with steam and/or carbon dioxide ($CO_2$) in the presence of the above-described catalyst. As the carbon-containing organic compound, a lower hydrocarbon such as methane, ethane, propane, butane or naphtha or a non-hydrocarbon compound such as methanol or dimethyl ether may be used. The use of methane is preferred. In the present invention, a natural gas (methane gas) containing carbon dioxide is advantageously used.

In the case of a method of reacting methane with carbon dioxide ($CO_2$) (reforming with $CO_2$), the reaction is as follows:

$$CH_4 + CO_2 \leftrightarrows 2H_2 + 2CO \qquad (1)$$

In the case of a method of reacting methane with steam (reforming with steam), the reaction is as follows:

$$CH_4 + H_2O \leftrightarrows 3H_2 + CO \qquad (2)$$

In the reforming with $CO_2$, the reaction temperature is 500–1,200° C., preferably 600–1,000° C. and the reaction pressure is an elevated pressure of 5–40 kg/cm²G, preferably 5–30 kg/cm²G. When the reaction is performed with a packed bed system, the gas space velocity (GHSV) is 1,000–10,000 hr$^{-1}$, preferably 2,000–8,000 hr$^{-1}$. The amount of $CO_2$ relative to the raw material carbon-containing organic compound is 20–0.5 mole, preferably 10–1 mole, per mole of carbon of the raw material compound.

In the reforming with steam, the reaction temperature is 600–1,200° C., preferably 600–1,000° C. and the reaction pressure is an elevated pressure of 1–40 kg/cm²G, preferably 5–30 kg/cm²G. When the reaction is performed with a packed bed system, the gas space velocity (GHSV) is 1,000–10,000 hr$^{-1}$, preferably 2,000–8,000 hr$^{-1}$. The amount of steam relative to the raw material carbon-containing organic compound is 20–0.5 mole, preferably 10–1 mole, more preferably 1.5–1 mole, per mole of carbon of the raw material compound.

In the reforming with steam according to the present invention, it is possible to produce a synthesis gas in an industrially favorable manner while suppressing the carbon deposition, even when the amount of steam ($H_2O$) is maintained 2 moles or less per mole of carbon of the raw material compound. In view of the fact that 2–5 moles of steam per mole of carbon in the raw material compound is required in the conventional method, the catalyst of the present invention, which can permit the reforming reaction to smoothly proceed with an amount of steam of 2 moles or less, has a great industrial merit.

In a case where a carbon-containing organic compound is reacted with a mixture of steam and $CO_2$ according to the present invention, the mixing proportion of steam and $CO_2$ is not specifically limited but is generally such as to provide a $H_2O/CO_2$ molar ratio of 0.1–10.

The above-described various reactions using the catalyst of the present invention may be carried out with various catalyst systems such as a packed bed system, a fluidized bed system, a suspension bed system and a moving bed system. The reaction may be carried out not only in one stage but also in plural stages.

In the process for the production of a synthesis gas according to the present invention, the energy required for the above reforming reaction is supplied by the heat of combustion obtained by subjecting a portion of a carbon-containing organic compound used as a raw material for the reforming reaction to partial oxidation (partial combustion).

The partial oxidation of the carbon-containing organic compound is carried out at a temperature of 600–1,500° C., preferably 700–1,300° C. and a pressure of 5–50 kg/cm²G, preferably 10–40 kg/cm²G. As an oxidation agent for partially oxidizing the carbon-containing organic compound, oxygen is used. As a source of oxygen, there may be used pure oxygen or an oxygen containing gas such as air or oxygen-rich air. The amount of oxygen used for the partial oxidation of the carbon-containing organic compound is, in terms of an atomic ratio O/C of oxygen (O) to carbon (C) of the carbon-containing organic compound, 4–0.1, preferably 2–0.5.

As a result of the partial oxidation of the carbon-containing organic compound, a high temperature mixed gas containing the unreacted carbon-containing organic compound and having a temperature of at least 600° C., preferably 700–1,300° C. is obtained. The unreacted carbon-containing organic compound contained in the mixed gas is reacted with carbon dioxide and/or steam to produce a synthesis gas. In this case, the carbon dioxide and/or steam used as a reactant for the carbon-containing organic compound may be reacted by being fed into the mixed gas obtained by the partial oxidation of the carbon-containing organic compound or by being previously added to and mixed with the carbon-containing organic compound supplied for the partial oxidation reaction. In the latter case, the partial oxidation and the reforming reaction can be carried out simultaneously.

As described above, the reforming reaction of the carbon-containing organic compound may be performed with various types of reactors and preferably carried out by a packed bed system or a fluidized bed system.

When the reforming is carried out in a packed bed system, the partial oxidation (partial combustion) of the carbon-containing organic compound is carried out in a space above the packed bed reactor. The mixed gas obtained in the space is passed through the packed bed catalyst layer located below the space to perform the reforming in the catalyst layer. In this case, the carbon-containing organic compound, carbon dioxide and steam are previously heated in an inlet portion of the reactor and are fed to an upper part of the reactor. A separately preheated oxidizing agent (oxygen, air, etc.) is also fed to the upper part of the reactor, where the reforming raw materials and the oxidizing agent are mixed and partially combusted in the space in the upper part of the reactor using a burner. The thus obtained high temperature mixed gas is passed through the catalyst layer below the space, so that the reforming reaction is performed.

When the reforming of the carbon-containing organic compound is performed in a fluidized bed system, the preheated carbon-containing organic compound, carbon dioxide and/or steam and the oxidizing agent gas are fed to a fluidized bed reactor from a lower part thereof to fluidize a catalyst charged in the reactor. While fluidizing the catalyst, the partial oxidation of the carbon-containing organic compound is carried out simultaneously with the reforming reaction.

EXAMPLE

The present invention will be further described in detail below by examples.

Catalyst Preparation Example 1

The particle size of aluminum oxide calcined at 650° C. for 1.5 h (hour) in air was adjusted to 0.27–0.75 mm. Thereafter, Ru was supported on the aluminum oxide by an impregnation method (incipient-wetness method). This was further calcined at 1,000° C. in air to obtain a Ru-supporting $Al_2O_3$ catalyst (Ru content was $3.0 \times 10^{-4}$ g per 1 g of $Al_2O_3$ and, in terms of molar amount, 0.03 mol %). The above impregnated material was obtained by adding dropwise an aqueous solution of ruthenium(III) chloride extremely little by little to the calcined $Al_2O_3$, with mixing by shaking after each dropwise addition. The Ru concentration in the aqueous solution of ruthenium(III) chloride added dropwise was 0.05% by weight. The impregnated material was dried at 120° C. for 2.5 h in air and calcined at 1,000° C. for 1.5 h in the same atmosphere to obtain the Ru-supporting $Al_2O_3$ catalyst (surface area: 18.6 $m^2/g$). The electronegativity Xi of $Al^{3+}$ of $Al_2O_3$ is 11.3.

Catalyst Preparation Example 2

The particle size of zirconium oxide calcined at 600° C. for 2 h in air was adjusted to 0.27–0.75 mm. Thereafter, Rh was supported on the zirconium oxide by an impregnation method. This was further calcined at 970° C. in air to obtain a Rh-supporting $ZrO_2$ catalyst (Rh content was $8.4 \times 10^{-6}$ g per 1 g of $ZrO_2$ and, in terms of molar amount, 0.001 mol %). The above impregnated material was obtained by adding dropwise an aqueous solution of rhodium(III) acetate extremely little by little to the calcined $ZrO_2$, with mixing by shaking after each dropwise addition. The Rh concentration in the aqueous solution of rhodium(III) acetate added dropwise was 0.0065% by weight. The impregnated material was dried at 120° C. for 2.5 h in air and calcined at 970° C. for 2 h in the same atmosphere to obtain the Rh-supporting $ZrO_2$ catalyst (surface area: 8.6 $m^2/g$). The electronegativity Xi of $Zr^{4+}$ of $ZrO_2$ is 12.0.

Catalyst Preparation Example 3

The particle size of magnesium oxide (magnesia) calcined at 600° C. for 2 h in air was adjusted to 0.27–0.75 mm. Thereafter, Rh was supported on the magnesium oxide by an impregnation method. This was further calcined at 1,100° C. in air to obtain a Rh-supporting MgO catalyst (Rh content was $2.6 \times 10^{-3}$ g per 1 g of Mg and, in terms of molar amount, 0.1 mol %). The above impregnated material was obtained by adding dropwise an aqueous solution of rhodium(III) acetate extremely little by little to the calcined MgO, with mixing by shaking after each dropwise addition. The Rh concentration in the aqueous solution of rhodium(III) acetate added dropwise was 1.7% by weight. The impregnated material was dried at 120° C. for 2.5 h in air and calcined at 1,100° C. for 2 h in the same atmosphere to obtain the Rh-supporting MgO catalyst (surface area: 0.6 $m^2/g$). The electronegativity Xi of $Mg^{2+}$ of MgO is 6.6.

Catalyst Preparation Example 4

Rh was supported on magnesium oxide (in the form of ⅛ inch pellets), calcined at 1,100° C. for 3 h in air, by an impregnation method. This was further calcined at 400° C. in air to obtain a Rh-supporting MgO catalyst (Rh content was $1.5 \times 10^{-3}$ g per 1 g of MaO and, in terms of molar amount, 0.06 mol %). The above impregnated material was obtained by soaking the calcined MgO pellets in an aqueous solution of rhodium(III) acetate having a Rh concentration of 1.0% by weight for about 3 h. The impregnated material was then dried at 120° C. for 2.5 h in air and calcined at 400° C. for 3 h in the same atmosphere to obtain the Rh-supporting MgO catalyst (surface area: 0.7 $m^2/g$). The electronegativity Xi of $Mg^{2+}$ of MgO is 6.6.

Catalyst Preparation Example 5

Rh was supported on magnesium oxide (in the form of ⅛ inch pellets), calcined at 1,100° C. for 3 h in air, by an impregnation method. This was further calcined at 1,000° C. in air to obtain a Rh-supporting MgO catalyst (Rh content was $2.6 \times 10^{-5}$ g per 1 g of MgO and, in terms of molar amount, 0.001 mol %). The above impregnated material was obtained by soaking the calcined MgO pellets in an acetone solution of rhodium(III) acetylacetonate having a Rh concentration of 0.017% by weight for about 3 h. The impregnated material was then dried at 120° C. for 2.5 h in air and calcined at 1,000° C. for 3 h in the same atmosphere to obtain the Rh-supporting MgO catalyst (surface area: 0.6 $m^2/g$). The electronegativity Xi of $Mg^{2+}$ of MgO is 6.6.

Catalyst Preparation Example 6

Rh was supported on magnesium oxide (in the form of ⅛ inch pellets), containing 5 mol % of calcium oxide and calcined at 1,100° C. for 3 h in air, by an impregnation method. This was further calcined at 950° C. in air to obtain a Rh-supporting CaO/MgO catalyst (Rh content was $7.5 \times 10^{-4}$ g per 1 g of CaO/MgO and, in terms of molar amount, 0.03 mol). The above impregnated material was obtained by soaking the calcined CaO/MgO pellets in an aqueous solution of rhodium(III) acetate having a Rh concentration of 0.5% by weight for about 3 h. The impregnated material was then dried at 120° C. for 2.5 h in air and calcined at 950° C. for 3 h in the same atmosphere to obtain the Rh-supporting CaO/MgO catalyst (surface area: 0.8 $m^2/g$) The average electronegativity Xi of the metal ions of the carrier is 6.5.

Catalyst Preparation Example 7

Rh was supported on magnesium oxide (in the form of ⅛ inch pellets), containing 10 mol % of lanthanum oxide and calcined at 1,100° C. for 3 h in air, by an impregnation method. This was further calcined at 950° C. in air to obtain a Rh-supporting $La_2O_3$/MgO catalyst (Rh content was $9.0 \times 10^{-5}$ g per 1 g of $La_2O_3$/MgO and, in terms of molar amount, 0.006 mol %). The above impregnated material was obtained by soaking the calcined $La_2O_3$/MgO pellets in an acetone solution of rhodium(III) acetylacetonate having a Rh concentration of 0.1% by weight for about 3 h. The impregnated material was then dried at 120° C. for 2.5 h in air and calcined at 950° C. for 3 h in the same atmosphere to obtain the Rh-supporting $La_2O_3/MgO$ catalyst (surface area: 0.8 m$^2$/g). The average electronegativity Xi of the metal ions of the carrier is 6.7.

Catalyst Preparation Example 8

The particle size of magnesium oxide calcined at 1,000° C. for 1.5 h in air was adjusted to 0.27–0.75 mm. Thereafter, Rh was supported on the magnesium oxide by an impregnation method. This was further calcined at 950° C. in air to obtain a Rh-supporting MgO catalyst (Rh content was 2.6×10$^{-4}$ g per 1 g of MgO and, in terms of molar amount, 0.01 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 0.17% by weight. The Rh-impregnated material was dried at 120° C. for 2.5 h in air and calcined at 950° C. for 1.5 h in the same atmosphere to obtain the Rh-supporting MgO catalyst (surface area: 5.8 m$^2$/g)

Catalyst Preparation Example 9

The particle size of magnesium oxide calcined at 920° C. for 2 h in air was adjusted to 0.27–0.75 mm. Thereafter, Ru was supported on the magnesium oxide by an impregnation method. This was further calcined at 920° C. in air to obtain a Ru-supporting MgO catalyst (Ru content was 1.5×10$^{-3}$ g per 1 g of MgO and, in terms of molar amount, 0.06 mol %). The above impregnated material was obtained by adding dropwise an aqueous solution of hydrated ruthenium(III) chloride extremely little by little to the calcined MgO, with mixing by shaking after each dropwise addition. The rhodium(III) chloride aqueous solution had a Ru concentration of 1.0% by weight. The Rh-impregnated material was dried at 120° C. for 2.5 h in air and calcined at 920° C. for 2 h in the same atmosphere to obtain the Rh-supporting MgO catalyst (surface area: 9.6 m$^2$/g)

Catalyst Preparation Example 10

The particle size of magnesium oxide calcined at 300° C. for 3 h in air was adjusted to 0.27–0.75 mm. Thereafter, Ir was supported on the magnesium oxide by an impregnation method. This was further calcined at 600° C. in air to obtain a Ir-supporting MgO catalyst (Ir content was 4.8×10$^{-3}$ g per 1 g of MgO and, in terms of molar amount, 0.10 mol %). The above impregnated material was obtained by adding dropwise an aqueous solution of iridium(IV) chloride extremely little by little to the calcined MgO, with mixing by shaking after each dropwise addition. The iridium(IV) chloride aqueous solution had a Ir concentration of 3.2% by weight. The Rh-impregnated material was dried at 120° C. for 2.5 h in air and calcined at 600° C. for 3 h in the same atmosphere to obtain the Ir-supporting MgO catalyst (surface area: 24.8 m$^2$/g).

Catalyst Preparation Example 11

The particle size of magnesium oxide calcined at 500° C. for 3 h in air was adjusted to 0.27–0.75 mm. Thereafter, Pt was supported on the magnesium oxide by an impregnation method. This was further calcined at 750° C. in air to obtain a Pt-supporting MgO catalyst (Pt content was 4.8×10$^{-3}$ g per 1 g MgO and, in terms of molar amount, 0.10 mol %). The above impregnated material was obtained by adding dropwise an aqueous solution of chloroplatinic acid ($[H_2PtCl_6]$) extremely little by little to the calcined MgO, with mixing by shaking after each dropwise addition. The chloroplatinic acid aqueous solution had a Pt concentration of 3.2% by weight. The Pt-impregnated material was dried at 120° C. for 2.5 h in air and calcined at 750° C. for 3 h in the same atmosphere to obtain the Pt-supporting MgO catalyst (surface area: 18.4 m$^2$/g)

Catalyst Preparation Example 12

The particle size of magnesium oxide calcined at 300° C. for 3 h in air was adjusted to 1.2–2.5 mm. Thereafter, Rh was supported on the magnesium oxide by an impregnation method. This was further calcined at 950° C. in air to obtain a Rh-supporting MgO catalyst (Rh content was 1.0×10$^{-3}$ g per 1 g of MgO and, in terms of molar amount, 0.04 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 0.68% by weight. The Rh-impregnated material was dried at 120° C. for 2.5 h in air and calcined at 950° C. for 3 h in the same atmosphere to obtain the Rh-supporting MgO catalyst (surface area: 6.0 m$^2$/g).

Catalyst Preparation Example 13

The particle size of magnesium oxide calcined at 930° C. for 3 h in air was adjusted to 0.27–0.75 mm. Thereafter, Ru was supported on the magnesium oxide by an impregnation method. This was further calcined at 970° C. in air to obtain a Ru-supporting MgO catalyst (Ru content was 7.5×10$^{-4}$ g per 1 g of MgO and, in terms of molar amount, 0.03 mol %). The above impregnated material was obtained by adding dropwise an aqueous solution of ruthenium(III) chloride extremely little by little to the calcined MgO, with mixing by shaking after each dropwise addition. The ruthenium(III) chloride aqueous solution had a Ru concentration of 0.50% by weight. The Ru-impregnated material was dried at 120° C. for 2.5 h in air and calcined at 970° C. for 3 h in the same atmosphere to obtain the Ru-supporting MgO catalyst (surface area: 5.2 m$^2$/g)

Catalyst Preparation Example 14

The particle size of magnesium oxide calcined at 350° C. for 3 h in air was adjusted to 0.27–0.75 mm. Thereafter, Rh was supported on the magnesium oxide by an impregnation method. This was further calcined at 1,050° C. in air to obtain a Rh-supporting MgO catalyst (Rh content was 2.0×10$^{-3}$ g per 1 g of Mg and, in terms of molar amount, 0.08 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 1.3% by weight. The Rh-impregnated material was dried at 120° C. for 2.5 h in air and calcined at 1,050° C. for 3 h in the same atmosphere to obtain the Rh-supporting MgO catalyst (surface area: 1.5 m$^2$/g).

Catalyst Preparation Example 15

The particle size of magnesium oxide calcined at 950° C. for 3 h in air was adjusted to 0.27–0.75 mm. Thereafter, Ru was supported on the magnesium oxide by an impregnation method. This was further calcined at 950° C. in air to obtain a Ru-supporting MgO catalyst (Ru content was 2.5×10$^{-4}$ g per 1 g of MgO and, in terms of molar amount, 0.01 mol %). The above impregnated material was obtained by adding dropwise an aqueous solution of ruthenium(III) chloride hydrate extremely little by little to the calcined MgO, with mixing by shaking after each dropwise addition. The ruthenium(III) chloride hydrate aqueous solution had a Ru concentration of 0.17% by weight. The Ru-impregnated material was dried at 120° C. for 2.5 h in air and calcined at 950° C. for 3 h in the same atmosphere to obtain the Ru-supporting MgO catalyst (surface area: 4.8 $m^2$/g). In this case, Ru was found to be supported as ruthenium oxide.

Catalyst Preparation Example 16

The particle size of magnesium oxide calcined at 300° C. for 3 h in air was adjusted to 0.27–0.75 mm. Thereafter, Rh was supported on the magnesium oxide by an impregnation method. This was further calcined at 1,050° C. in air to obtain a Rh-supporting MgO catalyst (Rh content was $2.3 \times 10^{-3}$ g per 1 g of MgO and, in terms of molar amount, 0.09 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 1.5% by weight. The Rh-impregnated material was dried at 120° C. for 2.5 h in air and calcined at 1,050° C. for 3 h in the same atmosphere to obtain the Rh-supporting MgO catalyst (surface area: 2.0 $m^2$/g). In this case, Rh was found to be supported as rhodium oxide.

Catalyst Preparation Example 17

The particle size of magnesium oxide calcined at 1,000° C. for 3 h in air was adjusted to 0.27–0.75 mm. Thereafter, Rh was supported on the magnesium oxide by an impregnation method. This was further calcined at 950° C. in air to obtain a Rh-supporting MgO catalyst (Rh content was $1.5 \times 10^{-4}$ g per 1 g of MgO and, in terms of molar amount, 0.006 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 0.1% by weight. The Rh-impregnated material was dried at 120° C. for 2.5 h in air and calcined at 950° C. for 3 h in the same atmosphere to obtain the Rh-supporting MgO catalyst (surface area: 5.6 $m^2$/g)

Catalyst Preparation Example 18

The particle size of magnesium oxide calcined at 500° C. for 3 h in air was adjusted to 0.27–0.75 mm. Thereafter, Rh and Pt were supported on the magnesium oxide by an impregnation method. This was further calcined at 1,050° C. in air to obtain a Rh- and Pt-supporting MgO catalyst (Rh and Pt contents were $1.8 \times 10^{-3}$ g and $4.8 \times 10^{-4}$ g, respectively, per 1 g of MgO and, in terms of molar amount, 0.07 and 0.01 mol %, respectively). The above impregnated material was obtained by adding dropwise an aqueous solution of rhodium(III) and chloroplatinic acid ($[H_2PtCl_6]$) acetate extremely little by little to the calcined MgO, with mixing by shaking after each dropwise addition. The mixed aqueous solution had Rh and Pt concentrations of 1.2% by weight and 0.32% by weight, respectively. The Rh- and Pt-impregnated material was dried at 120° C. for 2.5 h in air and calcined at 1,050° C. for 3 h in the same atmosphere to obtain the Rh- and Pt-supporting MgO catalyst (surface area: 1.4 $m^2$/g).

Comparative Catalyst Preparation Example 1

The particle size of magnesium oxide calcined at 370° C. for 3 h in air was adjusted to 0.27–0.75 mm. Thereafter, Rh was supported on the magnesium oxide by an impregnation method. This was further calcined at 370° C. in air to obtain a Rh-supporting MgO catalyst (Rh content was $2.6 \times 10^{-3}$ g per 1 g of MgO and, in terms of molar amount, 0.10 mol %). The above impregnated material was obtained by adding dropwise an aqueous solution of rhodium(III) acetate extremely little by little to the calcined MgO, with mixing by shaking after each dropwise addition. The rhodium(III) acetate aqueous solution had a Rh concentration of 1.7% by weight. The Rh-impregnated material was dried at 120° C. for 2.5 h in air and calcined at 370° C. for h in the same atmosphere to obtain the Rh-supporting MgO catalyst (surface area: 98 $m^2$/g).

Reaction Example 1

Using two interconnected reactors, an autmthermal reforming test was carried out. A raw material gas having a molar ratio of $CH_4:O_2=1:0.25$ was fed to a first reactor with GHSV (based on a catalyst contained in a second reactor) of 6,000 $hr^{-1}$ and subjected to a combustion reaction at a temperature of 950° C. and a pressure of 25 kg/$cm^2$G. To the second reactor, a gas discharged from the first reactor, oxygen and carbon dioxide were added (molar ratio of $CH_4$ (as raw material $CH_4$ fed to the first reactor):$O_2$:$CO_2$= 1:0.25:0.5), so that a reforming reaction was carried out using the catalyst (5 cc) obtained in Catalyst Preparation Example 17. The catalyst was previously subjected to a reduction treatment at 950° C. for 1 h in a $H_2$ stream. The reaction conditions included a temperature of 850° C. and a pressure of 25 kg/$cm^2$G. After 5 h from the commencement of the reaction, the $CH_4$ conversion was 71.8% and the contents of $H_2$ and CO in the product gas were 33.8 mol % and 30.0 mol %, respectively. The $CH_4$ conversion at 200 h after the commencement of the reaction was 71.6%.

Reaction Example 2

Using two interconnected reactors, an autothermal reforming test was carried out. A raw material gas having a molar ratio of $CH_4:O_2=1:0.5$ was fed to a first reactor with GHSV (based on a catalyst contained in a second reactor) of 5,000 $hr^{-1}$ and subjected to a combustion reaction at a temperature of 1,050° C. and a pressure of 25 kg/$cm^2$G. To the second reactor, a gas discharged from the first reactor and carbon dioxide were added (molar ratio of $CH_4$ (as raw material $CH_4$ fed to the first reactor):$CO_2$=1:0.5) so that a reforming reaction was carried out using the catalyst (5 cc) obtained in Catalyst Preparation Example 18. The catalyst was previously subjected to a reduction treatment at 850° C. for 1 h in a $H_2$ stream. The reaction conditions included a temperature of 700° C. and a pressure of 20 kg/$cm^2$G. After 5 h from the commencement of the reaction, the $CH_4$ conversion was 46.7% and the contents of $H_2$ and CO in the product gas were 19.6 mol % and 16.1 mol %, respectively. The $CH_4$ conversion at 150 h after the commencement of the reaction was 46.5%.

Comparative Reaction Example 1

An experiment was carried out in the same manner as that in Reaction Example 1 except that the catalyst obtained in Comparative Catalyst Preparation Example 1 was used. After 5 h from the commencement of the reaction, the $CH_4$ conversion was 71.7% and the contents of $H_2$ and CO in the product gas were 33.7 mol % and 29.8 mol %, respectively. The $CH_4$ conversion at 150 h after the commencement of the reaction was 42.3%.

Comparative Reaction Example 2

An experiment was carried out in the same manner as that in Reaction Example 2 except that the catalyst obtained in Comparative Catalyst Preparation Example 1 was used. After 5 h from the commencement of the reaction, the $CH_4$ conversion was 46.6% and the contents of $H_2$ and CO in the product gas were 19.7 mol % and 16.0 mol %, respectively. The $CH_4$ conversion at 150 h after the commencement of the reaction was 23.8%.

The catalyst used in the present invention shows considerably suppressed carbon deposition activity, while retaining activity required for converting a carbon-containing organic compound into a synthesis gas. According to the present invention, therefore, a synthesis gas can be produced continuously with a good yield for a long period of time while preventing carbon deposition.

Further, the use of the catalyst of the present invention can effectively suppress the carbon deposition even at a high pressure, so that a small size apparatus of producing a synthesis gas can be used and the device costs can be reduced.

In the present invention, the energy required for the reforming reaction of a carbon-containing organic compound is supplied by combusting a portion of the carbon-containing organic compound. A synthesis gas can be produced using a compact apparatus with good apparatus efficiency.

What is claimed is:

1. A process for producing a synthesis gas from a carbon-containing organic compound, wherein the carbon-containing organic compound is partially oxidized to form a mixed gas having a temperature of at least 600° C. and containing an unreacted carbon-containing organic compound, and wherein the unreacted carbon-containing organic compound is reacted with steam and carbon dioxide in the presence of a catalyst,
   wherein the amount of said steam is 2 moles or less per mole of carbon of said unreacted carbon-containing organic compound and 0.1–10 moles per mole of said carbon dioxide; wherein said reaction is performed at a pressure of 5–40 $Kg/cm^2G$;
   wherein said catalyst comprises a carrier consisting essentially of magnesium oxide, and at least one catalytic metal selected from rhodium and ruthenium and supported on said carrier, wherein said catalyst has a specific surface area of 5.8 $m^2/g$ or less, and wherein the amount of said catalytic metal is 0.001–0.08 mole %, in terms of metal, based on said carrier.

2. A process according to claim 1, wherein the specific surface area of said catalyst is 0.01–1.5 $m^2/g$.

3. A process according to claim 1, wherein said carrier contains at least 98% by weight of magnesium oxide and wherein the amount of impurities selected from Fe, Ni, $SiO_2$ and mixtures thereof is not greater than 1.0% by weight.

4. A process according to claim 1, wherein said carrier is obtained by calcining magnesium oxide at a temperature of 950–1,300° C.

5. A process according to claim 1, wherein said carbon-containing organic compound is natural gas.

* * * * *